US010353966B2

(12) United States Patent
Agarwal et al.

(10) Patent No.: US 10,353,966 B2
(45) Date of Patent: Jul. 16, 2019

(54) DYNAMIC ATTRIBUTES FOR SEARCHING

(71) Applicant: BloomReach, Inc., Mountain View, CA (US)

(72) Inventors: Navin Agarwal, Mountain View, CA (US); Mohit Jain, Bangalore (IN); Amit Aggarwal, Los Altos, CA (US); Omar Eduardo Fernández, Los Altos, CA (US)

(73) Assignee: BloomReach, Inc., Mountain View, CA (US)

( * ) Notice: Subject to any disclaimer, the term of this patent is extended or adjusted under 35 U.S.C. 154(b) by 423 days.

(21) Appl. No.: 14/946,173

(22) Filed: Nov. 19, 2015

(65) Prior Publication Data
US 2017/0148078 A1    May 25, 2017

(51) Int. Cl.
*G06F 16/00* (2019.01)
*G06F 16/9532* (2019.01)
*G06F 16/28* (2019.01)
*G06F 16/9535* (2019.01)
*G06F 16/22* (2019.01)
*G06F 16/9536* (2019.01)
*G06F 16/242* (2019.01)
*G06Q 30/06* (2012.01)

(52) U.S. Cl.
CPC ...... *G06F 16/9532* (2019.01); *G06F 16/2228* (2019.01); *G06F 16/242* (2019.01); *G06F 16/2425* (2019.01); *G06F 16/285* (2019.01); *G06F 16/9535* (2019.01); *G06F 16/9536* (2019.01); *G06Q 30/0625* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 6,856,992 B2 | 2/2005 | Britton | |
| 7,346,598 B2 | 3/2008 | Arora | |
| 7,478,100 B2 | 1/2009 | Murthy | |
| 7,698,261 B1* | 4/2010 | Khoshnevisan | .. G06F 17/30864 707/999.003 |
| 8,290,923 B2 | 10/2012 | Kurapat | |
| 8,862,588 B1 | 10/2014 | Gay | |

(Continued)

FOREIGN PATENT DOCUMENTS

CA    2471467 A1    5/2003

OTHER PUBLICATIONS

Hearst, Marti, Design recommendations for hierarchical faceted search interfaces, Aug. 2006, ACM SIGIR workshop on faceted search, (pp. 1-5). (Year: 2006).*

(Continued)

*Primary Examiner* — William J Allen
*Assistant Examiner* — Maria S. P. Heath
(74) *Attorney, Agent, or Firm* — Moser Taboada

(57) ABSTRACT

A dynamic attribute search engine system can be implemented to execute faceted searches using dynamic facets. In embodiments, a dynamic attribute search engine system includes one or more product databases, a data ingestor, an index, a query service, and a faceted searcher. The dynamic attribute search engine system is programmed to dynamically determine facets for a faceted search in response to dominant categories identified for each search query.

12 Claims, 2 Drawing Sheets

(56) References Cited

U.S. PATENT DOCUMENTS

| | | |
|---|---|---|
| 9,053,117 B2 | 6/2015 | Trebas |
| 2011/0225167 A1 | 9/2011 | Bhattacharjee |
| 2012/0310940 A1 | 12/2012 | Carmel et al. |
| 2013/0166568 A1 | 6/2013 | Binkert |
| 2013/0282765 A1 | 10/2013 | Bhattacharjee |
| 2014/0214897 A1 | 7/2014 | Zhu |
| 2014/0258277 A1 | 9/2014 | Cheng et al. |
| 2015/0046443 A1 | 2/2015 | Barkai et al. |
| 2015/0088924 A1 | 3/2015 | Abadi |
| 2017/0061015 A1* | 3/2017 | Gungor ............ G06F 17/30867 |

OTHER PUBLICATIONS

Tunkelang, Daniel, Dynamic Category Sets: An Approach for Faceted Search, 2006, pp. 1-5 (Year: 2006).*

* cited by examiner

DYNAMIC ATTRIBUTES FOR SEARCHING

BACKGROUND

Commonly, product search engines are utilized to implement search functionality for documents within one or more databases. In some cases, each document represents a product in one or more product databases for an e-commerce search engine. In many databases, the products are described by one or more attributes that could be organized in a faceted classification framework. The attributes may describe or indicate characteristics of the product itself and/or a product category.

When a faceted search engine processes a search query, it typically identifies one or more attributes in the search query string, finds documents that have the identified attribute values, and returns the results based on matches for the attributes. Faceted search engines typically have a static list of fields and/or facets that is predetermined prior to query time. Many databases have a large number (potentially thousands) of attributes to search. This type of search engine may suffer performance degradation as the number of facets increases because traditional faceting mechanisms may not be scalable from a performance or quality standpoint.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
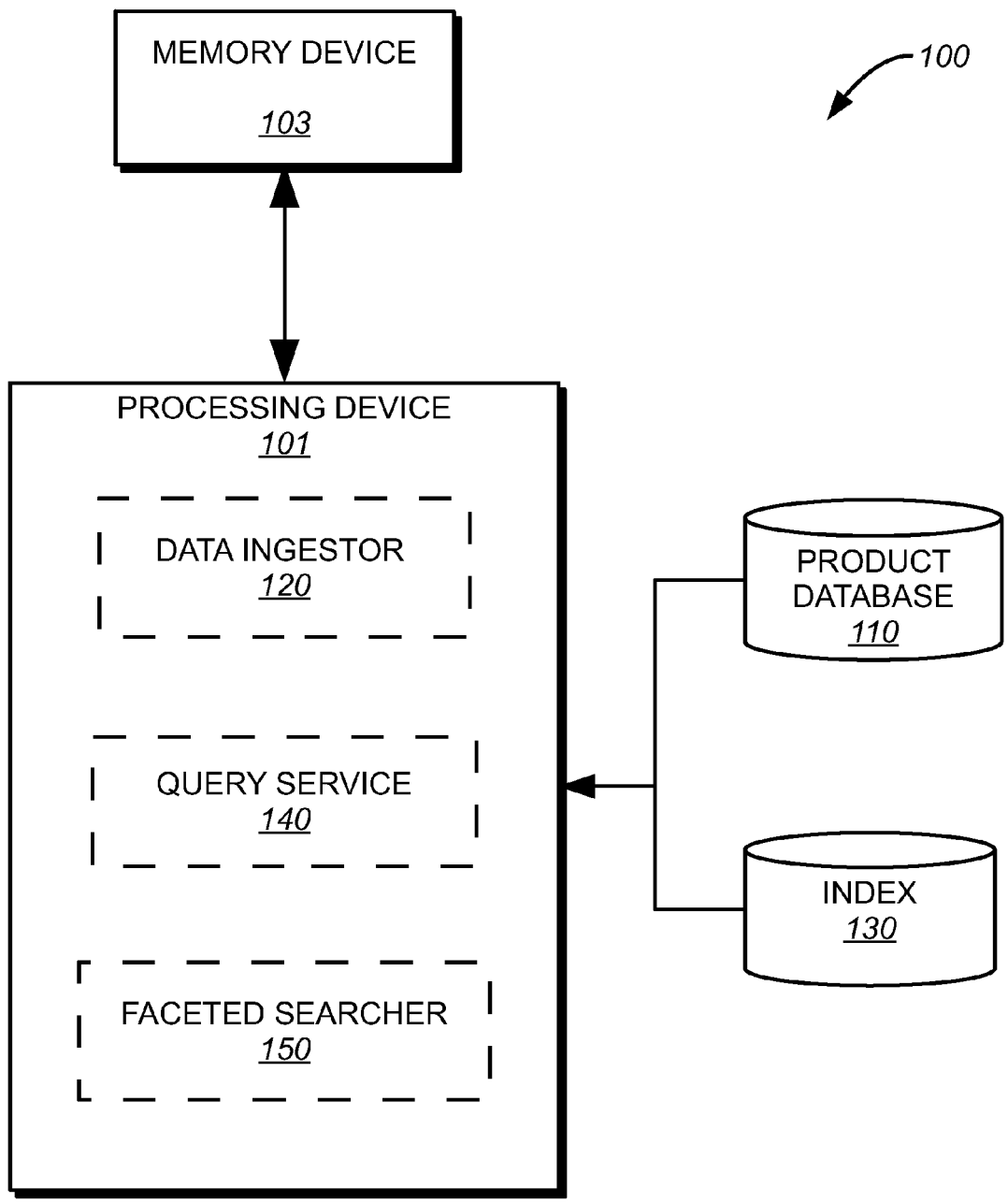
FIG. 1 is a block diagram illustrating a dynamic attribute search engine system according to one embodiment of the present disclosure and FIG. 2 is a diagram illustrating a method for carrying out a search query according to one embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure is directed to methods, systems, and computer programs for using attributes in search engines. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

FIG. 1 is a block diagram depicting a dynamic attribute search engine system 100 according to one embodiment of the present disclosure. In an embodiment, dynamic attribute search engine system 100 includes processing device 101, memory device 103, product database 110, and index 130. In one embodiment, memory device 103 has computer-readable instructions to direct processing device 101 to implement data ingestor 120, query service 140, and faceted searcher 150. According to various embodiments, the foregoing components and/or modules may be embodied as computer-readable instructions stored on various types of media. Any combination of one or more computer-usable or computer-readable media may be utilized in various embodiments of the present disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CD-ROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

In embodiments, product database 110 comprises a database for storing all products that are potentially available for searching. In various forms, product database 110 stores products and their attributes as key-value pairs. Embodiments of product database 110 are adapted to store a unique product identifier for each product. Other embodiments store a string representing the product name. For products having multiple attributes, there may be multiple attribute key-value pairs in product database 110 for that product. In embodiments, attributes may describe or correspond to one or more product categories or product characteristics.

In one embodiment, product database 110 comprises information regarding product and product attributes from one or more product data feeds. Product data feeds may be generated from various types or combinations of merchant product databases. In one embodiment, product database 110 is generated by collecting product information from one or more merchant websites and/or website backend product database. In embodiments, as the availability of various products changes, products may be added to or removed from product database 110 to reflect current product availability.

In one embodiment, data ingestor 120 comprises a computer processor and computer-readable instructions that direct the processor to ingest key-value pairs from product database 110 into index 130. In embodiments, the products and attributes in database 110 are in a continuous state of update, with products being added and removed to reflect product availability. Accordingly, data ingestor 120 can dynamically ingest new sets of products and attributes as frequently and in real-time or near real-time as the products and/or product attributes change in product database 110.

In embodiments, index 130 comprises a unified data structure. Embodiments of index 130 comprise a schemaless data store having numerous product attribute key-value pairs (in one illustrative example, key and value pairs for each product are stored as follows: "{$key_1|value_1, key_2|value_2, key_3|value_3, \ldots key_n|value_n$}"). Index 130 may dynamically add or remove key-value pairs in response to instructions from data ingestion module 120 to reflect current product attributes and/or current product availability. According to various embodiments, each key/value pair defines an attribute of a product. In one embodiment, each key is a product attribute and the corresponding value is the value for that attribute for a particular product. For example, a printer product may be associated with a key "printer type" with attribute values selected from "laserjet," "inkjet," etc. In embodiments, any number of product attributes and attribute values may be stored in index 130 and associated with any number of products.

According to embodiments, query service 140 comprises a computer processor and computer-readable instructions that are adapted to receive search queries from various user search interfaces where users can submit queries for products and/or product attributes. Search interfaces may comprise a merchant website, a search engine website, a smartphone app, or other types of user interfaces by which a user can submit a product search query. Query service 140 is further configured to execute search queries on index 130 as described in further detail below. In one embodiment, query service 140 can execute a search query by searching for matches between terms in the search query and product attributes and/or attribute values stored at index 130. In embodiments, matching attributes and/or attribute values are transmitted to faceted searcher 150 for dynamic post processing of search facets.

In one embodiment, faceted searcher 150 comprises a computer processor and computer-readable instructions that are adapted to carry out facet processing on search queries. In embodiments, faceted searcher 150 carries out post-processing selection of facets based on the attributes entered in the search query and matched from index 130. According to embodiments, no lists, fields, and/or facets are predetermined prior to query time. Faceted searcher 150 can select best-fit facets across all attributes for the given query result set. In embodiments, faceted searcher 150 can analyze the search query and determine the appropriate categories to search. In embodiments, faceted searcher 150 is programmed to determine the categories for the top search query results and return facets that are relevant to those top categories. In one embodiment, faceted searcher 150 is programmed to return a set number of facets. For example, in one embodiment, the top five facets are returned. In other embodiments, the number of facets to be returned is determined dynamically for each search query. For example, a matching score threshold may be instituted, where all categories/facets that have a matching score above or at the threshold are returned.

Embodiments of the present disclosure may be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowcharts or block diagram may represent a module, segment, or portion of code, which comprises one or more executable instructions for implementing the specified logical function(s). It is noted that each block and/or multiple blocks in the flowcharts or block diagrams may represent one or more physical systems, such as one or more server systems, a collection of systems (e.g., bladed server systems), a cluster of systems, mainframe computer system, or any type and configuration of systems. Such systems may also include virtualized resources such as virtual server systems, and may include one or more levels of virtualization. In embodiments, such module(s) and/or segment(s) or portion(s) of code may be implemented across sites to provide redundancy in the case of site or system failure. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Figure 2:
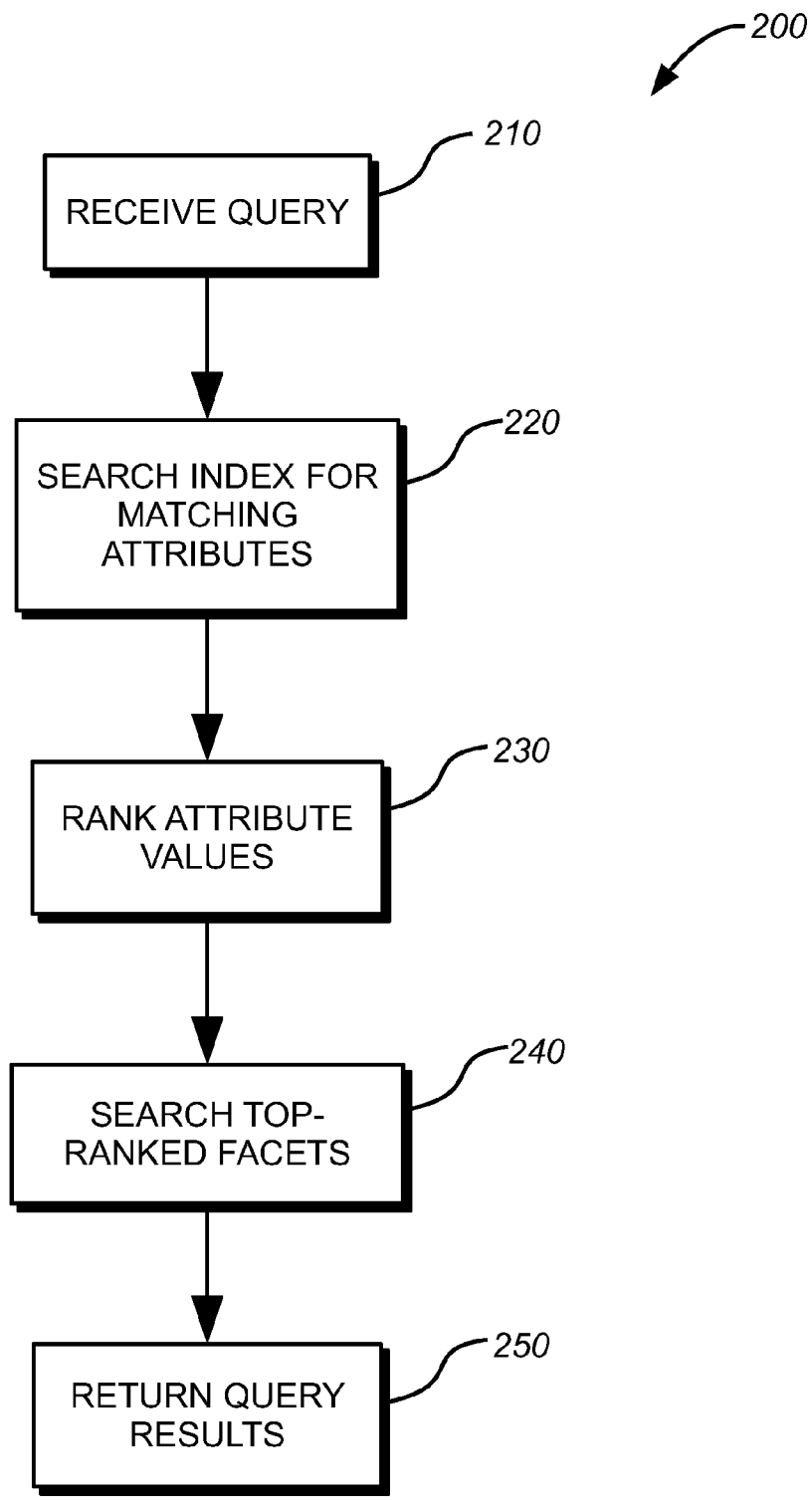

In operation, embodiments of the present disclosure are configured to carry out product search queries. Referring to FIG. 2, an illustration of a method 200 for executing a product search is set forth according to one embodiment of the present disclosure. Method 200 begins at operation 210, where a search query is received from a user. The user may submit the search query via a search box on a merchant's website, a general search engine website, on a merchant's shopping application installed on a mobile device (such as a smartphone, for example), on other types of mobile device applications, or via other types of interfaces where a search query string can be transmitted to the query service. In embodiments, an application program interface ("API") may be put in place to allow transmission of search queries from users on any number of devices and/or interfaces to the query service.

At operation 220, query service conducts a search for matching attributes and/or attribute values in the index. As described above, the index is created from product data ingested from one or more product databases. The query service can identify matches by determining similarities between the query string or portions of the query string with the strings of attributes and/or attribute values in the index. In embodiments, query service further searches for synonyms or other complementary terms from the search query or portions of the search query. The results of the search for matching attributes and/or attribute values in the index can then be transmitted to the faceted searcher for facet processing.

The faceted searcher can then aggregate the values received from the search query result into groups. In embodiments, each group comprises a set of attribute values for each associated attribute key. At operation 230, faceted searcher ranks the groups of attribute values according to the quantity of said attribute values in the results. The attribute keys having higher number of attribute values returned are ranked higher by the faceted searcher. In this manner, a faceted searcher can carry out a smart selection of facets without knowing the full set of attributes prior to execution of the search.

In embodiments, the faceted searcher can determine which facets to return for any particular query by identifying which facets comprise dominant categories in the query. The dominant categories may be determined by first selecting a portion of the most relevant products from all products returned by the query service. The number of dominant categories may be selected as a set percentage of the total categories returned by the query service, or the portion may be dynamically selected according to particular circumstances, needs, and/or preferences of the search. In one embodiment, 10% of all products returned from the query are selected. In another embodiment, 20% of all returned products are selected. For the selected products, the unique categories represented are identified. In other embodiments, 10%, 20%, or other static or dynamic portions of unique categories are selected as dominant categories. The unique categories represent the top-ranked facets that will then be searched by the faceted searcher.

The faceted searcher returns the top-ranked facets to the query service. At operation 240, the query service can search the index for products using the dominant categories as search facets and assemble a set of products having attributes matching the top-ranked facets. In some embodiments, these products are then ranked according to additional contextual factors such as user preferences, product availability, product price, or other relevant factors.

At operation 250, the query service returns the search query product results to the user. The search results can be returned to the user via the interface used to submit the search query. The search results may include links to product detail pages and/or product purchasing links. According to embodiments, the search results can be listed in ranked order according to the relevance of the products attributes to the dominant categories. Alternatively, the search results can be ranked and listed in an order selected by the user, such as product availability, product price, manufacturer, and the like.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the disclosure.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed:

1. A computer-implemented method for carrying out a search query comprising:
receiving, from a user, a search query for a product;
at a query service, searching a product index for at least one of product attributes or product attribute values of respective products identified in the product index matching a term in the search query;
at a faceted searcher, identifying a set of dominant product categories resulting from the searching of the product index, wherein identifying the set of dominant product categories comprises:
aggregating the product attribute values returned from the searching of the product index into respective product attribute groups, wherein each of the product attribute values in each product attribute group is associated with at least one of the products identified in the product index;
ranking each of the product attribute groups based on a number of product attribute values contained in a respective product attribute group; and at least one of:
identifying products associated with product attribute groups having a rank above a threshold, determining respective product categories for at least a portion of the identified products, and identifying the determined product categories as dominant product categories; or
determining respective product categories for each product associated with the product attribute groups, selecting at least a portion of the determined product categories, and identifying the selected product categories as dominant product categories;
at a faceted searcher, selecting one or more of the dominant product categories to act as one or more search facets;
at the query service, performing a faceted search of the product index for the one or more search facets; and transmitting, to the user, a result of the faceted search, the result identifying a group of products.

2. The method of claim 1, wherein identifying a set of dominant product categories comprises determining a set of top-ranked categories as a portion of a total number of categories returned from searching the product index.

3. The method of claim 2, wherein the portion of the total number of categories comprises five top-ranked categories.

4. The method of claim 2, wherein the portion of the total number of categories comprises a percentage of the total number of categories.

5. The method of claim 4, further comprising dynamically selecting the percentage.

6. The method of claim 4, wherein the percentage is a predetermined value.

7. A system for carrying out a search query, comprising one or more processors and one or more memory devices operably coupled to the one or more processors, the one or more memory devices storing executable and operational instructions effective to cause the one or more processors to:
   receive a search query for a product;
   search a product index for at least one of product attributes or product attribute values of respective products identified in the product index matching a term in the search query;
   identify a set of dominant product categories resulting from the search of the product index, wherein to identify the set of dominant product attribute categories, the memory devices store executable and operational code effective to cause the one or more processors to:
      aggregate the product attribute values returned from the search of the product index into respective product attribute groups, wherein each of the product attribute values, in each product attribute group is associated with at least one of the products identified in the product index;
      ranking each of the product attribute groups based on a number of product attribute values contained in a respective product attribute group; and at least one of:
         identifying products associated with product attribute groups having a rank above a threshold, determining respective product categories for at least a portion of the identified products, and identifying the determined product categories as dominant product categories; or
         determining respective product categories for each product associated with the product attribute groups, selecting at least a portion of the determined product categories, and identifying the selected product categories as dominant product categories;
   select one or more of the dominant product categories to act as one or more search facets;
   perform a faceted search of the product index for the one or more search facets; and
   transmit a result of the faceted search, the result identifying a group of products to a user.

8. The system of claim 7, wherein the memory devices store executable and operational instructions further effective to cause the one or more processors to:
   determine a set of top-ranked categories as a portion of a total number of categories returned from searching the product index.

9. The system of claim 8, wherein the portion of the total number of categories comprises five top-ranked categories.

10. The system of claim 8, wherein the portion of the total number of categories comprises a percentage of the total number of categories.

11. The system of claim 10, wherein the memory devices store executable and operational instructions further effective to cause the one or more processors to dynamically select the percentage.

12. The system of claim 10, wherein the percentage is a predetermined value.

\* \* \* \* \*